United States Patent

Quaeck et al.

[11] Patent Number: 5,957,267
[45] Date of Patent: Sep. 28, 1999

[54] RECIPROCATING CONVEYOR IN A TRAILER HAVING HIGHER STRUCTURAL AND OPERATIONAL EFFICIENCY

[76] Inventors: Manfred W. Quaeck, 1515-210th Ave. NE., Redmond, Wash. 98053; Erik A. Marttila, 4187 State St., Montlair, Calif. 91763

[21] Appl. No.: 08/957,497

[22] Filed: Oct. 24, 1997

[51] Int. Cl.⁶ .............................. B65G 24/04; B60P 1/00
[52] U.S. Cl. .................................... 198/750.5; 198/750.4; 414/525.1
[58] Field of Search .......................... 198/750.2, 750.4, 198/750.5; 414/525.1, 525.9

[56] References Cited

U.S. PATENT DOCUMENTS

| Re. 35,022 | 8/1995 | Foster | 198/750.5 |
| 4,184,587 | 1/1980 | Hallstrom | 198/750 |
| 4,508,211 | 4/1985 | Foster | 198/750 |
| 4,691,819 | 9/1987 | Foster | 198/750 |
| 4,709,805 | 12/1987 | Foster | 198/750 |
| 5,355,995 | 10/1994 | Foster | 198/750.4 |
| 5,390,781 | 2/1995 | Foster | 198/750 |
| 5,522,494 | 6/1996 | Lutz | 198/750.5 |

*Primary Examiner*—William E. Terrell
*Assistant Examiner*—Mark Deuble
*Attorney, Agent, or Firm*—Robert W. Jenny

[57] ABSTRACT

The conveyor forms the floor of the trailer and is made up of longitudinal slats slidably supported on cross beams. In a center frame trailer all the cross beams are supported on longitudinal beams. In a frameless trailer some of the cross beams are supported on longitudinal beams which are part of the suspension apparatus for the trailer. In both types of trailers three of the cross beams are activated to activate the slats. These three activated cross beams are called cross drives and are slidably mounted and positively guided directly on the longitudinal beams.

1 Claim, 4 Drawing Sheets

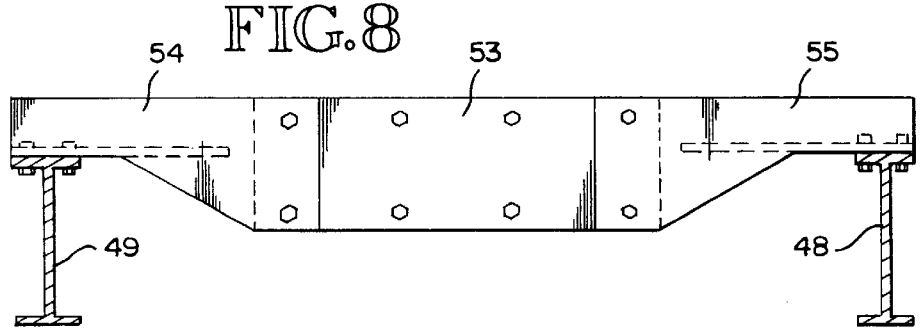
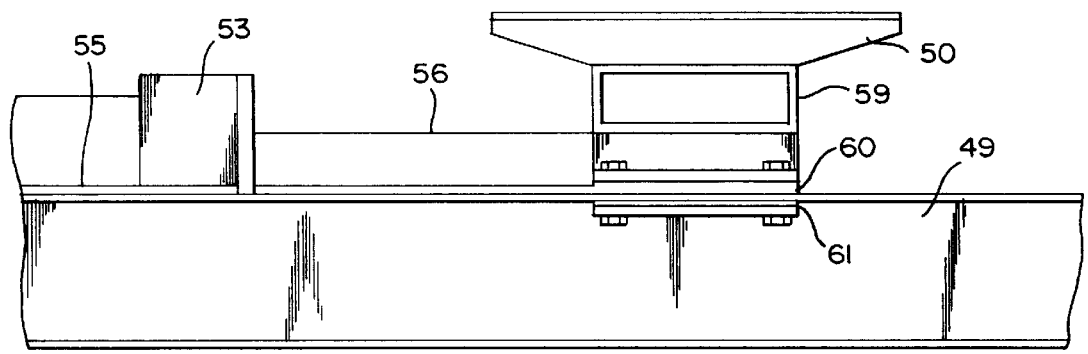
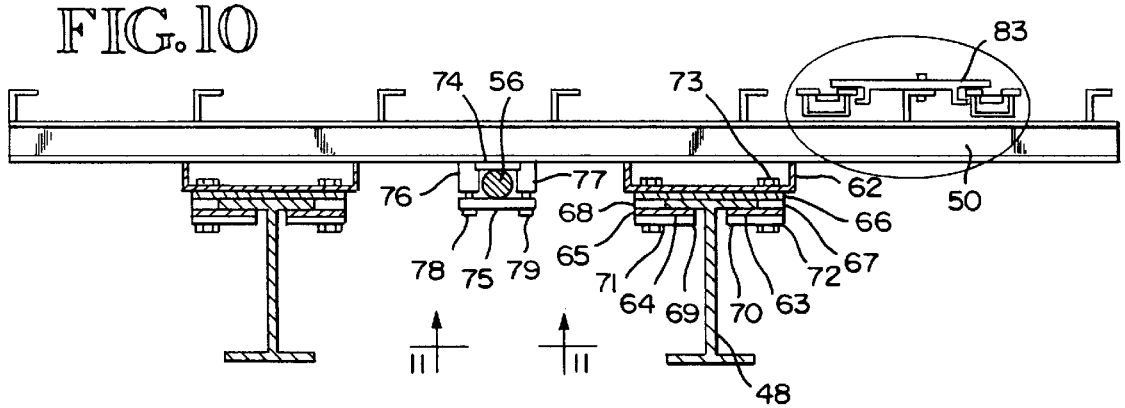
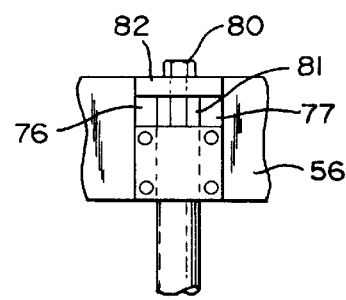

RECIPROCATING CONVEYOR IN A TRAILER HAVING HIGHER STRUCTURAL AND OPERATIONAL EFFICIENCY

BACKGROUND OF THE INVENTION

1. Field

The subject invention is in the field of reciprocating conveyors, particularly those used in trailers, either retrofitted or as original equipment. More particularly the invention is related to the interrelation of fixed and moving components of the conveyor and trailer and the transmission of loads from the moving to the fixed components.

2. Prior Art

The U.S. patents listed below are prior art closely related to the subject invention.

| | |
|---|---|
| 4,184,587 | 4,709,805 |
| 4,506,211 | 5,390,781 |
| 4,691,819 | RE 35,022 |

As is well known in the art, reciprocating conveyors carry the weight of loads and/or loading equipment such as forklifts on moving components known as slats which extend longitudinally in the trailer and form the floor of the trailer. The slats are supported on cross beams and, in the area of the mechanism for actuating the slats, on members called cross drives. In a high percentage of moving conveyor installations the actuation mechanism is hydraulic, using linear actuators comprising pistons, piston rods and cylinders. In the known and cited prior art the cross drives are supported on either the cylinders or piston rods of the actuation mechanism, with the result that a portion of the loads on the slats in the area of the actuation mechanism is transferred onto the actuators, applying primarily bending loads. Such loading causes excessive wear on the pistons, rods, seals and bearing surfaces of the actuators and also decreases the operational efficiency of the actuation. Actuators designed to accommodate these loads would be undesirably large, heavy and expensive. Accordingly, the primary objective of the subject invention is to provide a reciprocating conveyor, for use in a trailer, in which the loads on the conveyor are not transferred to the conveyor actuators. Further objectives are that the actuation mechanism and related structure be relatively small and simple and operationally and structurally efficient.

SUMMARY OF THE INVENTION

The subject invention is a reciprocating conveyor, for use in trailers, having relatively higher structural and operational efficiency. The higher efficiencies are achieved primarily by transferring loads on the conveyor directly to trailer structure and not through the conveyor actuators. As is well known in the art, reciprocating conveyors in trailers comprise reciprocating slats which form the floor of the trailer. The slats are supported by cross beams and cross drives and are attached to the cross drives which are connected to a drive unit which reciprocates the slats. In the subject invention the cross drives are slidably mounted and positively guided on and supported by longitudinal beam structures which also support static cross beams. In so-called frameless trailers the longitudinal beams are part of the suspension system (i.e. spring, wheels, axles) of the trailer and are attached to some of the crossbeams. In center frame trailers the longitudinal beams extend the full length of the trailer. Bearings are mounted on fixtures attached to the cross drives and engage flanges on the tops of the longitudinal beams. A drive unit is mounted on structures attached to the longitudinal beams and attached to the cross drives. Provisions are made for accurate alignment of the drive unit so that it is not subjected to any loads other than those involved in actuating the slats via the cross drives.

The invention is described in more detail below with reference to the attached drawings.

BRIEF DESCRIPTION OF THE DRAWINGS

FIG. 8 is a sectional view taken at 8—8 in FIG. 7.

FIG. 9 is a sectional view taken at 9—9 in FIG. 7.

FIG. 10 is a sectional view taken at 10—10 in FIG. 7.

FIG. 11 is a view from 11—11 in FIG. 10.

DETAILED DESCRIPTION OF THE INVENTION

Figure 1:
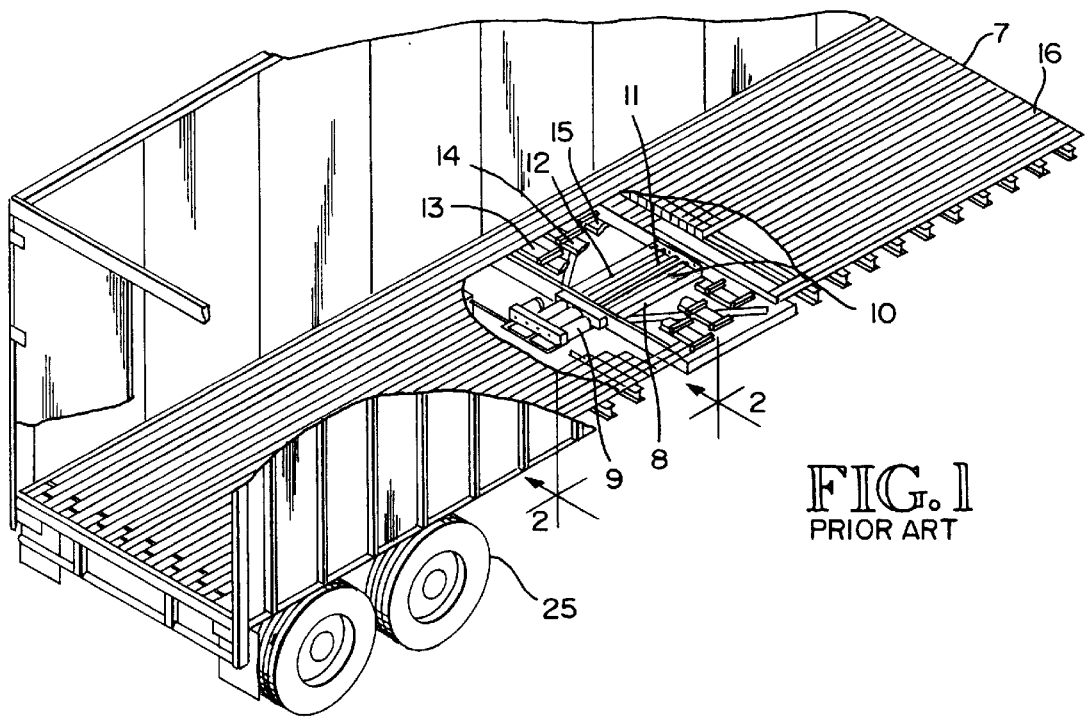
FIG. 1 is a cutaway view of a frameless trailer incorporating a prior art reciprocating conveyor.
Figure 2:
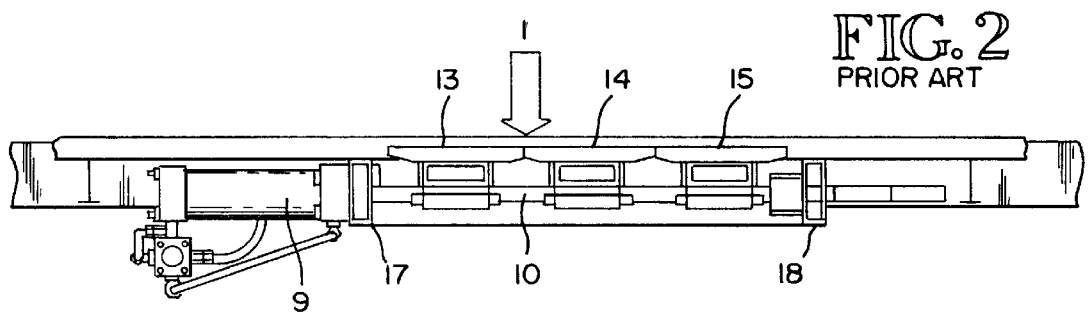
FIG. 2 is a sectional view taken at 2—2 in FIG. 1.
Figure 3:
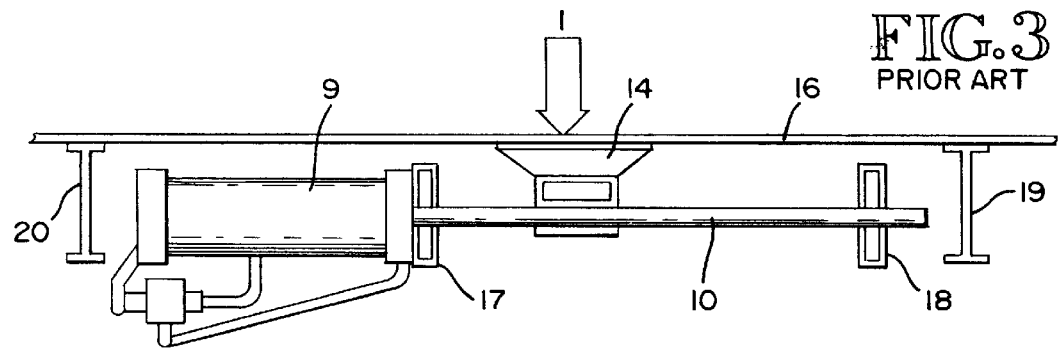
FIG. 3 is a schematic illustration of drive features of FIG. 2.

The subject invention is a reciprocating conveyor for use in a trailer and having structural and operational efficiencies higher than conventional trailer installed reciprocating conveyors. FIG. 1 is a cutaway view of a frameless trailer 6 with a prior art reciprocating conveyor 7 installed, the cutaway showing a prior art drive system 8 for the conveyor, the drive system being typical of prior art drive systems for reciprocating conveyors. The drive system comprises a drive unit 9 having piston rods 10, 11 and 12. Each piston rod is connected to a cross drive, cross drives 13, 14 and 15. Each cross drive drives ⅓ of the slats which form the floor of the trailer, slat 16 being typical. FIG. 2 is a sectional view taken at 2—2 in FIG. 1 showing the attachment of the cross drives to the piston rods. FIG. 3 is a schematic illustration of the drive features shown in FIG. 2 with components numbered as in FIG. 2. The drive unit and piston rods are mounted on drive unit cross members 17 and 18. The slats are supported on cross members 19 and 20. Loads applied to the slats (floor) of the conveyor, signified by arrow 1, are transmitted to the cross drives and then to the piston rods. Such loads tend to bend the piston rods which has adverse effects on the piston rods and seals and bearing surfaces of the actuators in the drive unit. The loads and related bending also increase friction in the drive unit, adversely affecting its operational efficiency. These conditions prevail in any reciprocating conveyor in which floor loads are transmitted to components of the conveyor drive unit.

Figure 4:
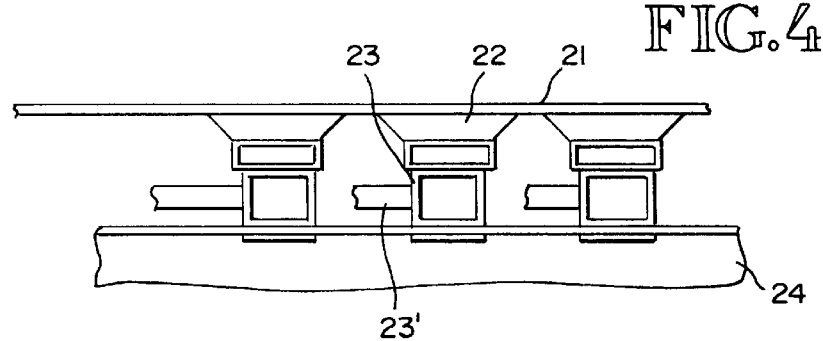
FIG. 4 is a schematic illustration of drive features according to the subject invention.

FIG. 4 is a schematic illustration of the drive installation according to the subject invention. Slat(s) 21 is(are) supported on the cross drives, cross drive 22 being typical. The cross drives are supported on fixtures, fixture 23 being typical, which are supported and positively guided on longitudinal beam(s) 24. These beams are either the longitudinal beams which support the floor of center frame trailers or the beams which integrate the suspension 25 (FIG. 1) (i.e., the wheels, axles and springs) of a frameless trailer with the trailer. The fixtures move on the beams on bearings shown in FIG. 10 and described below. Each cross drive is driven by a piston rod, rod 23' being typical.

Figure 5:
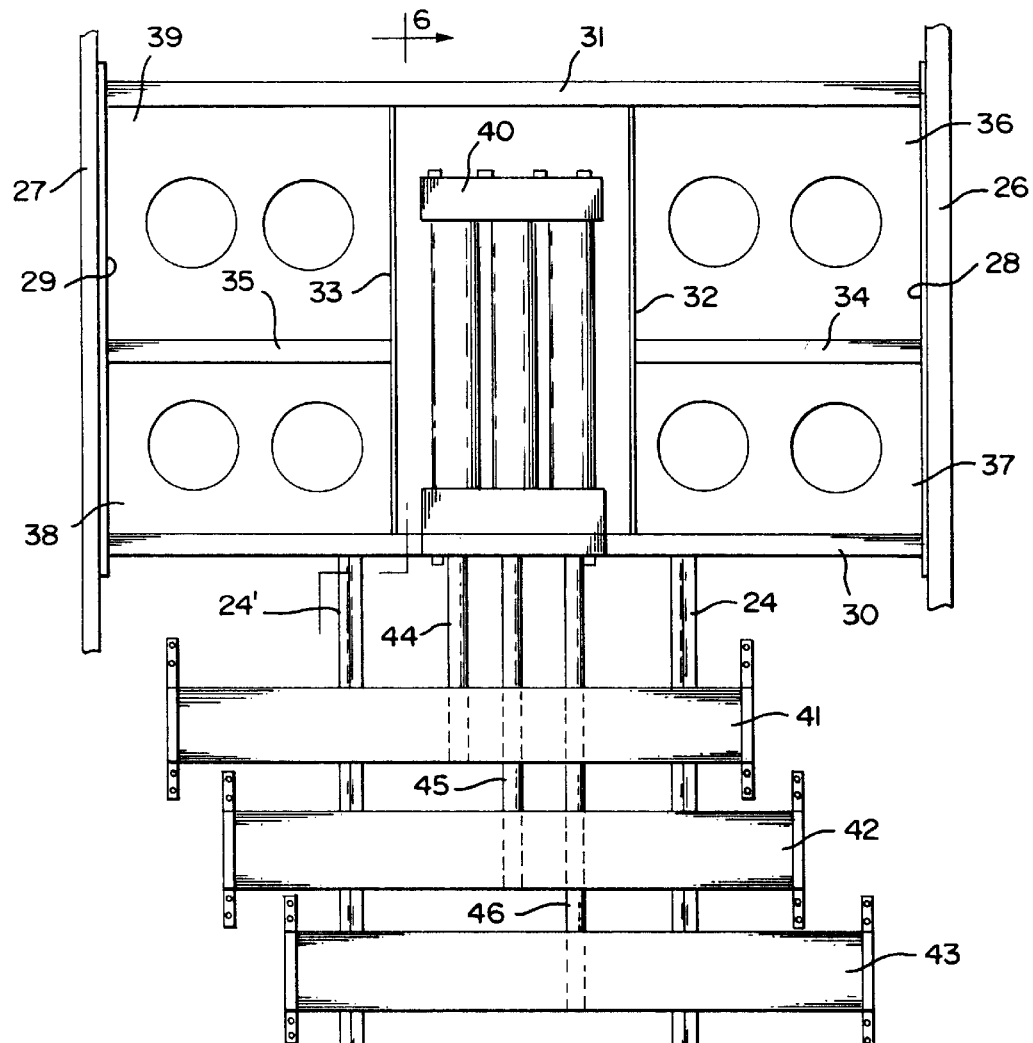
FIG. 5 is an elevation view of a drive installation according to the subject invention in a frameless trailer.

FIG. 5 is an elevation view of a drive installation according to the subject invention in a frameless trailer. In a frameless trailer the cross beams which support the floor are attached to side beams, beams 26 and 27 in this view. Cross beams are removed to accommodate the cross drives of the drive installation. Edge plates 28 and 29 are attached to beams 26 and 27 respectively and are interconnected by beams 30 and 31. Beams 30 and 31 are interconnected by plates 32 and 33 and those plates are interconnected with plates 28 and 29 by beams 34 and 35. Shear plates 36, 37, 38 and 39 are attached to the beams and plates surrounding them and stiffen the assembly to accommodate the thrust loads produced by drive unit 40 which is attached to beam 30. Beam 30 is attached to beams 24 and 24' of the suspension of the trailer. Cross drives 41, 42 and 43 are slidably mounted on beams 24 and 24' as shown in FIG. 10 and as described below. Piston rod 44 is connected to cross drive 41, piston rod 45 to cross drive 42 and rod 46 to cross drive 47.

Figure 6:
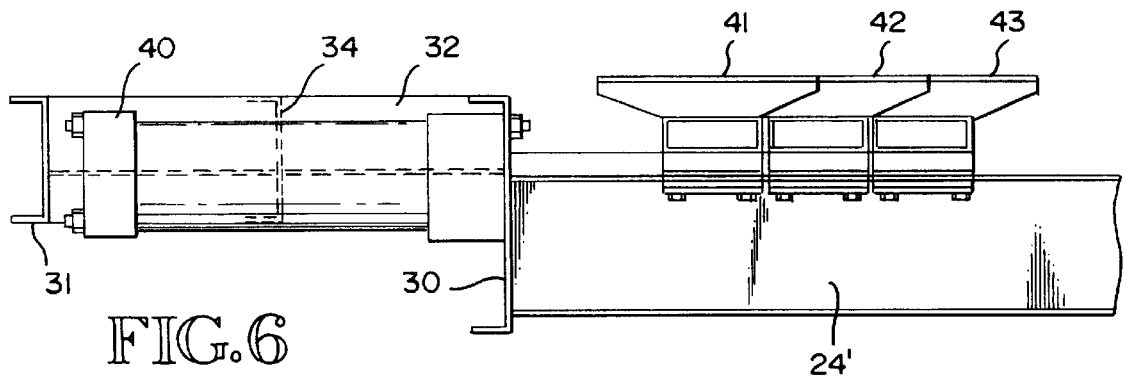
FIG. 6 is a side view of the installation of FIG. 5.

FIG. 6 is a semi-schematic sectional view, taken at 6—6 in FIG. 5, of the installation of FIG. 5 with parts numbered as in FIG. 5.

Figure 7:
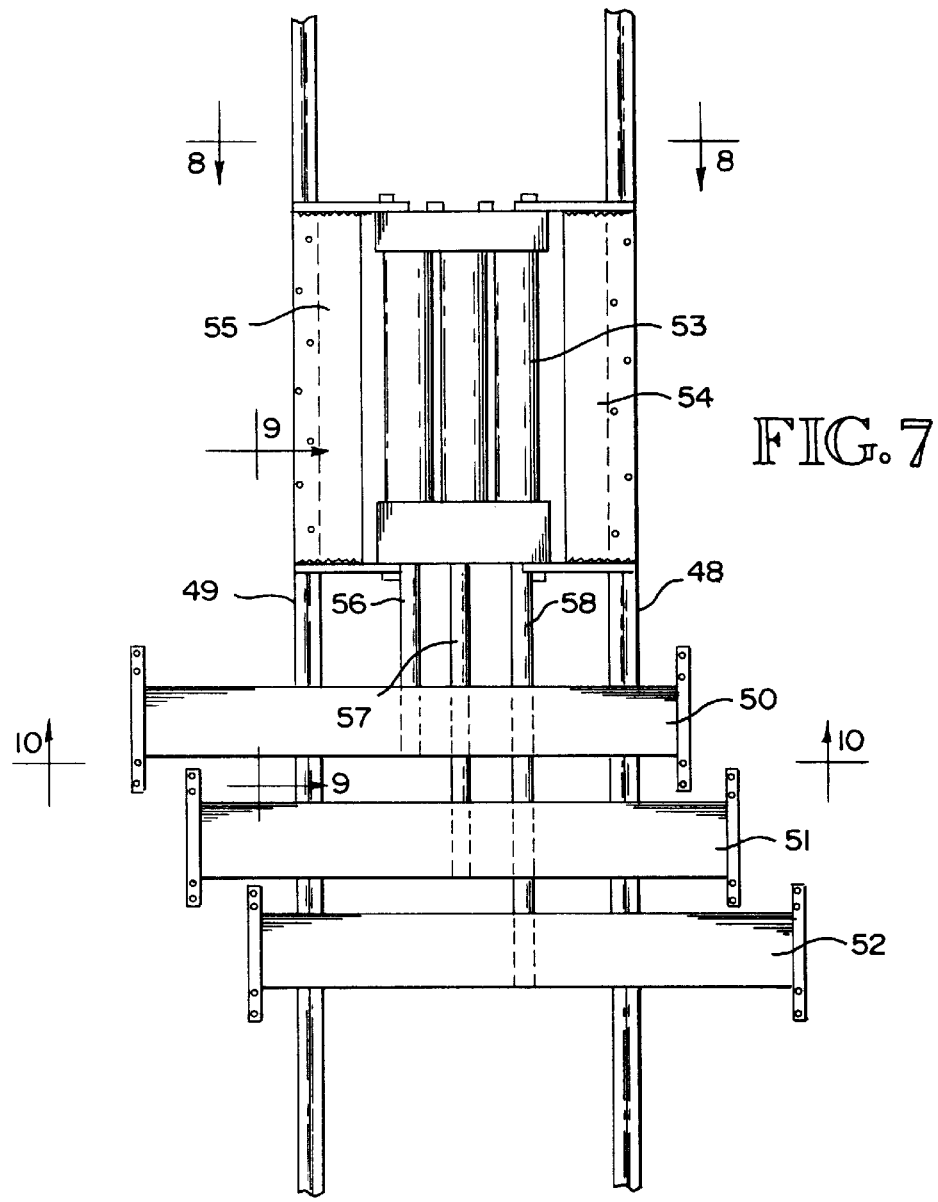
FIG. 7 is an elevation view of a drive installation according to the subject invention in a center frame trailer.

FIG. 7 is an elevation view of a drive installation for a center frame trailer. Longitudinal beams 48 and 49 support the cross beams of the trailer floor. Cross beams are removed to accommodate the cross drives 50, 51 and 52 of the installation. Drive unit 53 is attached to the longitudinal beams by structural assemblies 54 and 55 and piston rods 56, 57 and 58 are attached to cross drives 50, 51 and 52 respectively. FIG. 8 is a sectional view taken at 8—8 in FIG. 7 showing structural assemblies 54 and 55 supporting drive unit 53 from beams 48 and 49. FIG. 9 is a sectional view taken at 9—9 in FIG. 7 showing cross drive 50, beam 48, piston rod 56, fixture 59 supporting the cross drive on the longitudinal beam on bearings 60 and 61, structural assembly 54 and drive unit 53.

FIG. 10 is a sectional view taken at 10—10 in FIG. 7 showing more details of the bearings supporting the fixtures supporting the cross drives and of the connection of a piston rod to a cross drive. As an example, fixture 62 attached to cross drive 50 is slidably attached to flanges 63 and 64 on beam 48 by bearing assembly 65 comprising plain bearing 66, spacer 67 and 68, plain bearings 69 and 70 and plates 71 and 72 held assembled by fasteners, fastener 73 being typical. Piston rod 56 is clamped between spacer 74 and plate 75 and blocks 76 and 77 by fasteners 78 and 79. FIG. 11 is a view from 11—11 in FIG. 10 and shows more details of the connection of a piston rod to a cross drive. Bolt 80 threads into the end 81 of the piston rod through plate 82 attached to blocks 76 and 77 which are attached to cross drive 50 to transfer linear loads from the piston rod to the cross drive.

The encircled details show slat 83 attached to cross drive 50.

It is considered to be understandable from this description that the subject invention meets its objectives. It provides a reciprocating conveyor, for use in a trailer, in which the loads on the conveyor are transferred directly to static structure and not through conveyor actuator components. The actuation mechanism and related structure are relatively small and simple and operationally and structurally efficient, primarily because the actuation mechanism does not bear extraneous loads.

It is also considered to be understood that while certain embodiments of the invention are described herein, other embodiments and modifications of those described are possible within the scope of the invention which is limited only by the attached claims.

I claim:

1. A reciprocating conveyor in a center frame trailer, said trailer comprising fixed structure including (1) floor structure comprising cross beams and (2) longitudinal beams supporting said cross beams, said conveyor comprising (1) a plurality of slats slidably mounted on said cross beams, (2) a plurality of cross drives, with some of said plurality of slats being attached to each of said cross drives, (3) a drive unit connected to each of said cross drives and (4) structural elements for attaching said drive units to said fixed structure, said cross drives being mounted on said longitudinal beams such that they are slidably and positively guided directly on said longitudinal beams of said trailer and that said drive units reciprocate said cross drives and said slats attached to said cross drives.

* * * * *